(12) United States Patent
Neil et al.

(10) Patent No.: US 11,337,051 B2
(45) Date of Patent: May 17, 2022

(54) PEER DISCOVERY IN DISTRIBUTED EPC

(71) Applicants: ATTOCORE LTD, Cambridge (GB); David Neil, Cambridge (GB); Jason Cooper, Cambridge (GB)

(72) Inventors: David Neil, Cambridge (GB); Jason Cooper, Cambridge (GB)

(73) Assignee: Attocore Limited, Cambridge (GB)

( * ) Notice: Subject to any disclaimer, the term of this patent is extended or adjusted under 35 U.S.C. 154(b) by 0 days.

(21) Appl. No.: 17/048,847

(22) PCT Filed: Apr. 12, 2019

(86) PCT No.: PCT/EP2019/059419
§ 371 (c)(1),
(2) Date: Oct. 19, 2020

(87) PCT Pub. No.: WO2019/201772
PCT Pub. Date: Oct. 24, 2019

(65) Prior Publication Data
US 2021/0258765 A1    Aug. 19, 2021

(30) Foreign Application Priority Data

Apr. 20, 2018  (GB) .................................. 1806430
Jul. 20, 2018  (GB) .................................. 1811864

(51) Int. Cl.
*H04W 8/00*  (2009.01)
*H04W 76/12*  (2018.01)
(Continued)

(52) U.S. Cl.
CPC ............. *H04W 8/005* (2013.01); *H04W 8/04* (2013.01); *H04W 8/28* (2013.01); *H04W 60/04* (2013.01); *H04W 76/12* (2018.02)

(58) Field of Classification Search
CPC ....... H04W 8/005; H04W 76/12; H04W 8/04; H04W 8/28; H04W 60/04
(Continued)

(56) References Cited

U.S. PATENT DOCUMENTS 8,958,404 B2 * 2/2015 Malkamaki ........... H04W 48/14
                                                 370/338
9,019,894 B2 * 4/2015 Aramoto ........... H04W 36/0011
                                                 370/328
(Continued)

FOREIGN PATENT DOCUMENTS

EP          3062549 A    8/2016

*Primary Examiner* — Nghi H Ly
(74) *Attorney, Agent, or Firm* — Optimus Patents US, LLC

(57) ABSTRACT

A discovery protocol for use in a mobile telecommunications network where the protocol is used to discover a target core network component of the network. The network comprises base station core network components having at least one Mobile Management Entity (MME), a Serving Gateway (SGW) a Packet Gateway (PGW), an HSS; and a discovery request distributor connected to all other network components. The protocol utilizes the steps of: sending a discovery request from a first core network component to a discovery request distributor, where the discovery request includes a target identifier of a target core network component to be discovered; forwarding the discovery request to all other core network components within the network; receiving a discovery response at the first network component, from an identified target core network component with the defined target identifier and no responses from the other target core network components.

21 Claims, 5 Drawing Sheets

(51) Int. Cl.
    *H04W 8/04*     (2009.01)
    *H04W 8/28*     (2009.01)
    *H04W 60/04*     (2009.01)

(58) Field of Classification Search
    USPC ................ 370/329, 328, 338, 341, 345, 350
    See application file for complete search history.

(56) References Cited

U.S. PATENT DOCUMENTS

| | | |
|---|---|---|
| 2007/0110066 A1 | 5/2007 | Chen |
| 2011/0153844 A1 | 6/2011 | Bovo |
| 2011/0299682 A1* | 12/2011 | Hallenstal ............. H04L 63/061 380/247 |
| 2016/0095036 A1 | 3/2016 | Stojanovski |
| 2017/0201456 A1* | 7/2017 | Siow ................. H04W 28/0289 |
| 2017/0332296 A1 | 11/2017 | Nilsson |

\* cited by examiner

PEER DISCOVERY IN DISTRIBUTED EPC

FIELD OF INVENTION

This invention relates to mobile telecommunications and particularly 4G LTE (4$^{th}$ generation long term evolution) networks.

BACKGROUND OF INVENTION

The following information is defined by the 3GPP (3$^{rd}$ generation partnership project) standards.

A Long-Term Evolution (LTE) network includes a Packet Data Network Gateway (PGW), a Serving Gateway (SGW) and a Mobile Management Entity (MME). The PGW is part of the UE (user equipment) data path and provides the UE IP (internet protocol) connectivity to an external network. The SGW is part of the UE data path and is responsible for routing and forwarding data packets between the UE and the PGW. The MME handles the signalling on behalf of the UE and decides which SGW and PGW to assign to each UE. A UE may connect to multiple PGWs in order to communicate with multiple external networks.

An Enhanced Packet Core (EPC) is a mobile core network supporting LTE. The EPC contains various core network components including MMEs, SGWs and PGWs. An eNodeB is a component of an LTE network. It provides a radio connection to the UE.

Within an EPC, various components need to communicate with each other. For example, during handover and relocation, MMEs need to communicate with each other.

In order for the MMEs to communicate with each other, the first MME needs to know some information about the second MME. For example, during handover, the first MME may know the Tracking Area Identifier (TAI) of the target cell and need to figure out which MME handles that TAI and then figure out the address of that MME. In the case of relocation, the UE moves to a new eNodeB controlled by a new EPC and sends a Tracking Area Update message containing the GUTI (Globally Unique Temporary Identifier) allocated by the old MME. The GUTI contains the GUMMEI (Globally Unique Mobile Management Entity Identifier) which identifies the old MME. The new MME then needs to figure out the address of the old MME from the GUMMEI.

There are two standard approaches to address this problem.

The first and simplest approach is using configuration. The first MME could be configured with a list of Target Area Identifiers (TAIs) and for each TAI it could be configured with the address of an MME that handles the TAI. The downside of this approach is that every MME needs to be configured with the TAIs and addresses of every other MME; this can be a lot of configuration.

The second approach is using DNS (Domain Name Service). When the first MME wants to know the address of a target MME that handles a TAI, the first MME constructs an FQDN (Fully Qualified Domain Name) based on the TAI and then issues a DNS request for that FQDN. The request is received by a Domain Name Server which looks up the FQDN and returns the address of the server (MME) associated with that FQDN.

The process to build the FQDN is defined by the 3GPP standards. A TAI is made up of a 3-character Mobile Country Code (MCC), a 2 or 3-character Mobile Network Code (MNC) and a two-byte Tracking Area Code (TAC). The FQDN is then formed as: tac-lb<TAC-low-byte>.tac-hb<TAC-high-byte>.tac.epc.mnc<MNC>.mcc<MCC>.3gppnetwork.org For example if a TAI has a MCC=001, an MNC=01 and a TAC=0x1234 then the FQDN would be:
tac-lb34.tac-hb12.tac.epc.mnc01.mcc001.3 gppnetwork.org The DNS server still needs to be configured with the mappings from FQDN to address, but this can be configured in a single location rather than having to configure this information in every MME.

The disadvantages of configuration in every MME is that there is a lot of configuration data stored in lots of places that all needs to be kept up to date. For example, if the address of one MME was changed, then every other MME would need to be reconfigured with the new address of the MME. This is a difficult task with a small number of MMEs, but quickly becomes impractical with large numbers of MMEs.

The disadvantages of DNS are less obvious. In fact, DNS is probably the preferred choice in many scenarios, but in deployments where all the network components are deployed on a common network supporting broadcast then this invention provides an improvement.

The first disadvantage of DNS is that configuration is still required albeit significantly reduced. For example, if the address of one MME was changed, then the DNS server would also have to be reconfigured.

The second disadvantage is that DNS is not ideally designed to operate in an unreliable distributed environment. An unreliable distributed environment refers to a group of network components with inconsistent connectivity between the network components. One plausible deployment model would be a single DNS server in the centre of the network. This works while all the network components have connectivity to the centre of the network, but fails if a group of network components want to communicate with each other while not having network connectivity to the centralised DNS server. Another plausible deployment would be to put a DNS Server at the centre of the network and a DNS Cache on each of the network components. The DNS Cache remembers the results of previous DNS queries and can subsequently answer DNS requests from its local cache. This scenario still does not fully address the issue of a group of network components with connectivity to each other but no connectivity to the central DNS server. The network components can only communicate with each other if they have already issued DNS requests for each other in the recent past and can therefore get DNS responses from the local DNS cache.

EP3062549 describes a network node and method that allows an eNodeB in the network to discover an MME in the network. In known mobile communications systems, such as described in this document, large numbers of eNodeBs are typically deployed. The network will have been specifically designed to minimising the configuration required for the eNodeB, so that each eNodeB can operate effectively in the network. This is because it is generally much easier to produce hundreds/thousands of unconfigured eNodeBs when the network is set up, than it is to configure each eNodeB in the network individually-which would be immensely time consuming. The use of discovery protocols in these existing networks therefore allows an eNodeB with minimal configuration to automatically find the network and start to provide service.

In a standard mobile telecommunications network, there are far fewer Core Network components, compared to the number of eNodeBs and the core network components are typically configured by hand, in a large data centre with reliable wired connectivity between all of the core network components, hence there is little motivation to provide a discovery service between the core network components. Furthermore, Core Network components are able to use a centrally located DNS server as a rough equivalent to a discovery protocol, hence again there is no need for providing a discovery protocol between the core network components.

Thus, the following problem(s) has (have) been resolved, by the present invention.

This problem can be resolved in deployments where the network components are all located on a common network supporting broadcast (or multicast) using a discovery protocol. For example, when an MME want to find the address of the target MME that handles a specific TAI, the MME broadcasts a Discovery message containing the target TAI. This message is received by all the MMEs on the layer 2 network. Most of the MMEs receive the message and discard it as they are not responsible for the TAI. The target MME that handles the TAI receives the message and sends a Discovery response containing its own address.

According to the invention there is provided a discovery protocol for use in a mobile telecommunications network to discover a target core network component of said network, wherein said network comprises: at least one base station; core network components comprising at least one Mobile Management Entity (MME), at least one Serving Gateway (SGW) and at least one Packet Gateway (PGW), an HSS; and a discovery request distributor connected to all other network components; wherein the protocol comprises the following steps: sending a discovery request from a first core network component to said discovery request distributor, where said discovery request includes a target identifier of a target core network component to be discovered; forwarding said discovery request to all other core network components within said network; receiving a discovery response at the first core network component, from at least one identified target core network component with the defined target identifier and no responses from the other target core network components.

In an embodiment of the invention, said discovery request distributor is a switch. Alternatively, the discovery request distributor is a router.

Preferably, said target identifier is one or more of: Tracking Area Identifier (TAI), a Globally Unique MME Identifier (GUMMEI), a Diameter Origin Host a Tracking Area Code (TAC) or a base station identifier.

In an embodiment of the invention, the discovery protocol further comprises the step of: sending an interface message from said first core network component to said identified target core component after said discovery response is received at said first core network component.

Preferably, said discovery request further comprises an interface type, where the interface type is one of S1, S5, S6a, S10 or S11.

In a further preferred embodiment of the invention, said discovery request also comprises a target component type. Preferably, said component type is one of MME, SGW, PGW, HSS or base station.

In an embodiment of the invention, said discovery request also comprises protocol type information. Preferably, said protocol type information is one of GTP, Diameter or S1AP.

Further preferably, said discovery response includes a target address for said target core network component. The target address is one of IPv4, IPv6, FQDN.

In a preferred embodiment of the invention, said first core network component sending said discovery request is a first MME. Further preferably, said target core network component providing said discovery response is a second MME.

Preferably the invention further comprises the step of: receiving the discovery response at the discovery request distributor and forwarding the response to said first core network component.

In a preferred embodiment of the invention the first core network component receives a plurality of discovery responses from target core components with the defined target identifier, and the first core network component will choose a preferred core target component from all of the responding target core components to use.

In an embodiment of the invention there is also provided a method for attaching a wireless subscriber unit to a base station comprising the steps of: sending an attach request from said wireless subscriber unit to said base station; executing the discovery protocol described above; performing an attach completion process.

In an alternative embodiment of the invention there is provided a method for relocation of a wireless subscriber unit within a network from a first base station to a second base station, comprising the steps of: sending a tracking area update request from said wireless subscriber unit to said second base station; executing the discovery protocol as described above; performing a GTP bearer set-up process. In a preferred embodiment the method further comprises the steps of: executing a further discovery protocol after said GTP bearer set-up; completing said tracking area update.

In a further preferred embodiment of the invention there is also provided a method for handover of a wireless subscriber unit within a network from a first base station to a second base station comprising the steps of: sending a handover request from the first base station to the MME of said wireless subscriber unit; executing the discovery protocol as described above; completing said handover process.

BRIEF DESCRIPTION OF THE FIGURES

Further details, aspects and embodiments of the invention will now be described, by way of example only, with reference to the drawings. In the drawings, like reference numbers are used to identify like or functionally similar elements. Elements in the figures are illustrated for simplicity and clarity and have not necessarily been drawn to scale.

Figure 1:
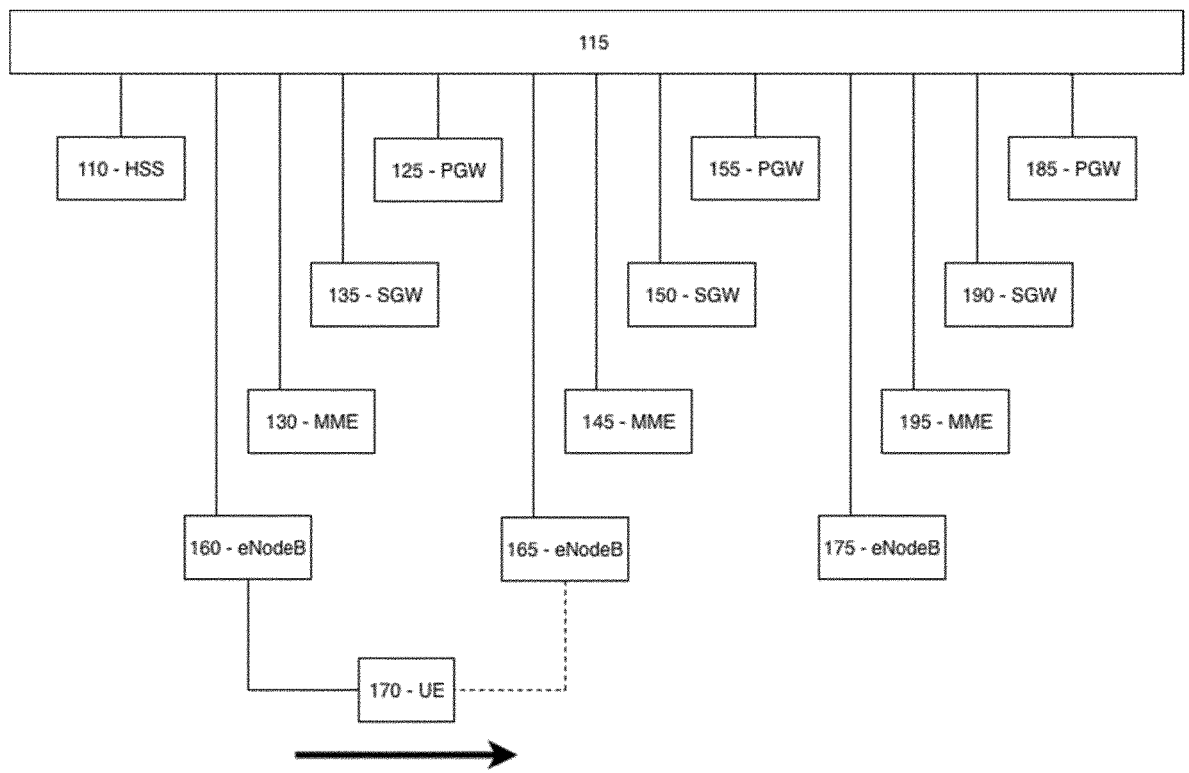
FIG. 1 shows an example telecommunications network.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

The discovery protocol can take many different forms, but at a basic level the protocol requires two distinct messages; a Discovery Request message and a Discovery Response message, that is sent in response to the discovery request. The Discovery Request message will be sent by a Source Component (a first network component) in the network to one or more Potential Target core Components in the network. One of the Potential Target core Components determines that it is the Actual Target core Component (based on the information in the discovery request) and responds back to the original source component that sent the discovery request with a Discovery Response message. The other potential targets that are not the actual target will not respond to the discovery request message from the first network component.

In an embodiment of the invention, The Discovery Request message contains sufficient information to allow the Potential Target core Components in the network to determine whether they are the Actual Target core Component. In an example of the invention, the information in the Discovery Request message is a target Identifier that is associated with the Actual Target core Component. This allows the Actual Target core Component to identify itself from the many Potential Target core Components within the network that may all receive the discovery request message. In an example of the invention the Target Identifier could be a Tracking Area Identifier (TAI). Alternatively, the target identifier may be one of a Globally Unique MME Identifier (GUMMEI), a Diameter Origin Host, a Tracking Area Code (TAC) or a base station identifier, for example, a Global eNodeB ID. In fact, the target identifier may be any identifier associated with a network component.

Preferably, in an example of the invention the Discovery Request message may also inform the Target core Component about how the first core network component wants to communicate with the Target core Component.

In an example of the invention the Discovery Response message contains sufficient information to allow the first core network Component to establish the required connection to the Target core Component.

In an embodiment of the invention, the Discovery Request message may include an Interface Type indicating the interface which the first network component wants to use to communicate. For example, it could be S10 interface to communicate with a target MME, or it could be S6a interface to communicate with a target HSS (home subscriber service). The Interface Type could be any interface supported by the Target Component. Other possible interfaces are S1 (between an eNodeB and an MME), and S11 (between an MME and an SGW) and S5 (between an SGW and a PGW).

In an example of the invention, the Discovery Request message may include a Target Component Type (e.g. MME, HSS, SGW, PGW, base station). Only potential targets components of the requested type would then consider responding to the discovery request. This may be needed in the general case as an Interface Type does not uniquely identify the intended target. For example, the S6a goes between the HSS and the MME; we need to identify which one of the two components should be responding.

In a further embodiment of the invention the Discovery Request message may include Protocol Type information (e.g. Diameter, GTPc, S1AP). This information provides guidance about which interface the request sender wanted to connect to. For example, if the Protocol Type was GTPc then the request sender is likely to want to access the S10 interface. In some cases, a network component may have multiple interfaces supporting the same protocol. For example, an MME can have an S10 and an S11 interface that both use GTPc.

In an example of the invention, the Discovery Request message could potentially omit the Interface Type and Component Type and rely only on the type of the Target Identifier specified in the request to figure out what kind of interface the request sender is interested in. For example, if the target component, that may be an MME receives a request for a Diameter Origin Host value the target component may assume that the user wanted to access the S6a interface.

In an example of the invention, there may be multiple Actual Target Components identified by a single Discovery Request. In this case, all the Actual Target Components would send a Discovery Response and the sender of the Discovery Request would choose which Actual Target Component to use. For example, an eNodeB could send a Discovery Request with the Target Identifier set to its locally configured TAI and the Interface Type set to S1. The eNodeB would receive responses from any MME that could support the target TAI. The eNodeB could then connect to one of the discovered MMEs.

In example embodiments of the invention the Discovery Response may contain multiple IP addresses (and ports) in the case when the target interface can be terminated at multiple different addresses.

In an example of the invention, the Target Address contains sufficient information to communicate with the Target core network component over the specified Interface Type. In an example of the invention the target address includes an IP address, that may be an IPv4 or an IPv6 address. The address may alternatively be a MAC address or an FQDN. In a further embodiment of the invention the target address may include a port number.

FIG. 1 shows the various network components in a preferred embodiment of the invention. A wireless subscriber unit (user equipment) 170 is shown, along with three base stations (eNodeB) 160, 165, 175, although the invention may work with any number of base stations. The network also contains core network components comprising multiple SGWs 135, 150, 190, multiple PGWs 125, 155, 185 and multiple MMEs 130, 145, 195 and an HSS 110. All the core network components are connected to a discovery request distributor 115. In an example of the invention the discovery request distributor (115) is a switch, alternatively, the distributor may be a router. In this way, the network comprises one or more base stations, one or more MMEs, one or more SGWs, one or more PGWs, a HSS and a discovery request distributor.

Figure 2:
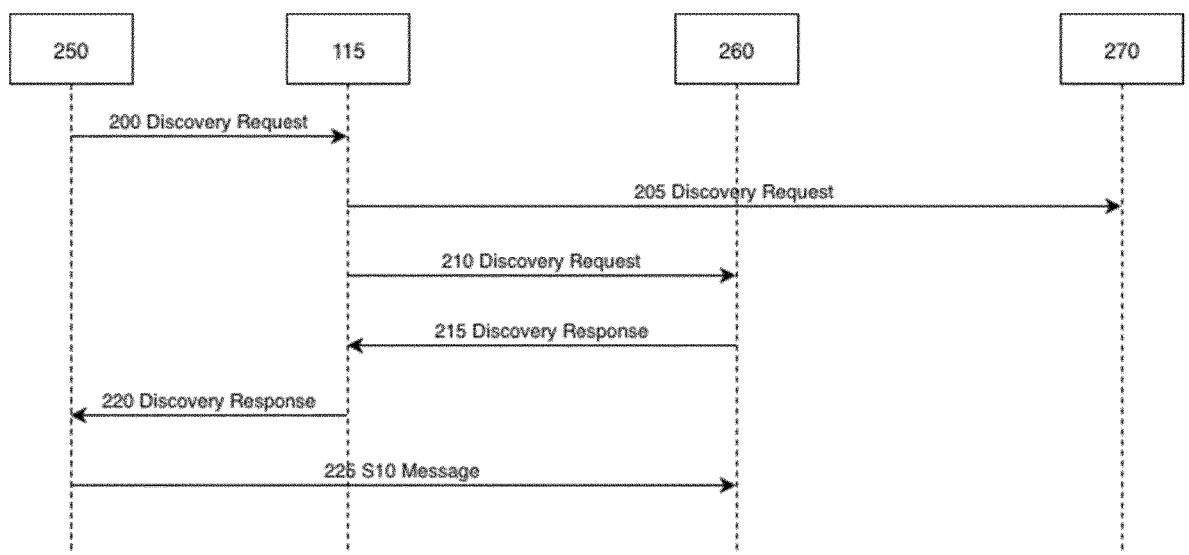
FIG. 2 shows a message sequence chart corresponding to a discovery protocol.

FIG. 2 shows an example of the Discovery Protocol in action. In this example, the first core network component 250 is the network component that wants to discover a target core component (260). The potential target core components (260, 270) each have a unique identifier. In a preferred example of the invention, the first core network component is first MME (130), and the target core network component (260) is a target MME (145) and the unique core component identifier is a GUMMEI. However, in other examples of the invention the source/first network component and the target component may be any of the core network components.

In this example of the invention, the first core network component (250) broadcasts an example Discovery Request (200) searching for a specific target core component. In this example of the invention the discovery request contains the Target core Component Type set to MME, the target GUMMEI and the target interface set to S10. This information will ensure that only the MME with the target GUMMEI will respond to the discovery request from the first core network component (250). The discovery requester distributor (115), in this case, a switch receives the discovery request (200) and sends the request on to the other components that make up the rest of the network (260, 270). Other potential target core components (270) receive the Discovery Request (205) and in this example, the request is ignored by the other core components (270) as potential targets (270) knows nothing about the target GUMMEI that is specified in the discovery request.

Core Network component (260) receives the Discovery Request (210) from the discovery request distributor (115) and replies to the discovery request distributor (115), as core network component (260) is configured with the target GUMMEI that was specified in the discovery request. Network component (260) will be the only network component that responds to the discovery request. The Network Component (260) sends a Discovery Response (215) with the Target Address set to the address of the Network Component (260) on the S10 interface. The discovery request distributor (115) forwards the discovery response message (220) to the first core network component (250). The first core network component (250) can then make use of this information in the discovery response to send an interface message (225) to the target core component (260). Preferably, the message to the target core component (260) is sent on an S10 interface.

In other examples of the invention, different interfaces may be possible, for example, if the interface was S6a rather than S10, then the discovery request would be querying for a different Identity Type, and the interface message (225) would be a Diameter S6a message to the MME instead of a GTPc S10 message.

In this example of the Discovery Protocol it is assumed that each core network component has a single handler to the Discovery Protocol which only responds to discovery requests addressed to the network component. An alternative implementation could have a Discovery Protocol handler representing multiple core network components. In this example of the invention, the Discovery Protocol handler would know about the unique identifiers of all represented core network components and would know about the interface addresses of all represented core network components. The Discovery Protocol handler would respond to any discovery request messages addressed to any of the represented core network components and would provide a target address corresponding to the addressed core network component.

The above description of the Discovery Protocol assumes the use of an underlying network supporting broadcast. An equally good alternative implementation of the discover protocol could use a network supporting Multicast with the discovery request distributor (115) replaced by network equipment such as Routers. For example, if all the network components were part of the same multicast group, then the initial Discovery Request would be addressed to the Multicast Group and the Router would then distribute the message to all members of the Multicast Group.

In a preferred embodiment of the invention Discovery Request (200) includes a Target Identifier. In an example of the invention the Target Identifier may be GUMMEI; in which case the discovery request is for a target core component with the specified ID. Alternatively, the Target Identifier may be Diameter Origin Host; in which case the discovery request is for the target core component with the specified ID. In another example of the invention, the Target Identifier may be a Tracking Area Identifier (TAI); in which case the discovery request is for the target component that is handling the specified TAI. Alternatively, the Target Identifier may be Global Cell ID; in which case the discovery request is for the MME to which the eNodeB with the specified ID is connected. The Target Identifier may be GUTI; in which case the discovery request is for the MME that allocated the GUTI. The Target Identifier may be any identifier which can be associated with one network component.

Each receiver of the Discovery Request has to identify whether it is the intended target of the discovery request. Preferably, in an example of the invention the Discovery Request may include a Target core Component Type to allow the receiver of the request to determine if it is the correct target core component, or if it is acting on behalf of the correct target core component. The receiver of a Discovery Request may determine the Target core Component Type based on the type of the Target Identifier. The receiver of a Discovery Request may determine the Target core Component Type based on other knowledge; for example, in an implementation where only MME components support the Discovery Protocol, then the Target core Component Type can be assumed to be MME.

The receiver of a Discovery Request must be able to identify which interface is being targeted. In a preferred embodiment of the invention, the Discovery Request (200) may include an Interface Identifier to allow the receiver to determine the target interface. The receiver of a Discovery Request may determine the target interface based on the type of the Target Identifier. The receiver of a Discovery Request may determine the target interface based on other knowledge; for example, in an implementation where the Discovery Protocol is only used for finding S10 interfaces, then the target interface can be assumed to be S10.

The Discovery Request is used in an environment where a single message transmission can be automatically sent to multiple destinations. In an example embodiment, this may be a broadcast network such as Ethernet. In a further example, this may be a IP network supporting multicast. The Discovery Protocol reception could be handled independently on each network component or could be handled centrally on a handler representing a group of network components.

The Discovery Protocol can be used in many different scenarios, examples of alternative scenarios are shown below.

Figure 3:
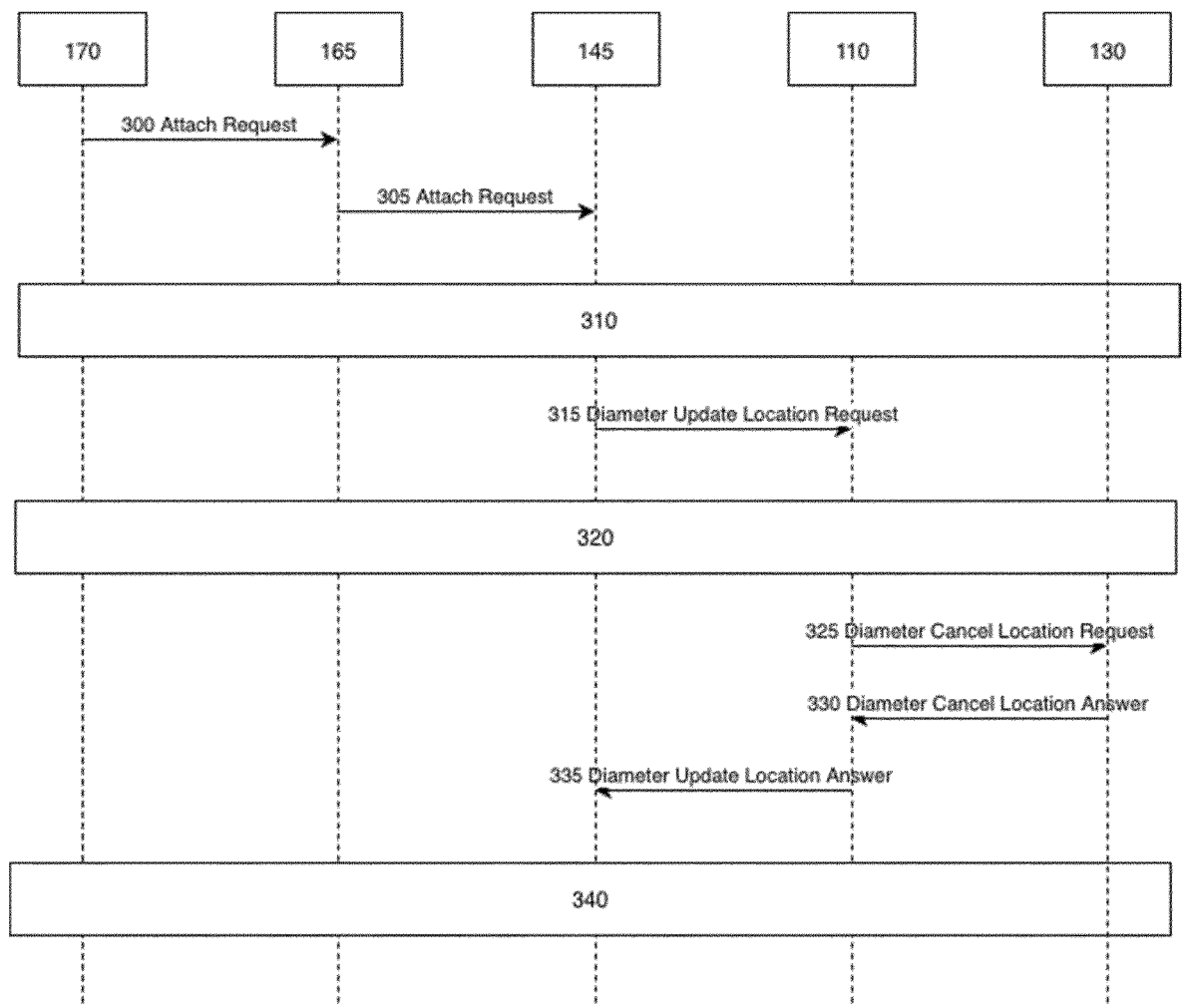
FIG. 3 shows a message sequence chart corresponding to the use of a discovery protocol during an attach procedure.

FIG. 3 shows an example of the use of the Discovery protocol during the Attach procedure. The UE (170) initiates the attach procedure by sending an Attach Request (300) which is forwarded (305) by the eNodeB (165) to the MME (145). After completing authentication and security (310), the MME (145) initiates the Update Location procedure by sending the Diameter Update Location Request (315) to the HSS (110). Assuming that the UE had previously been attached to another MME (130), then the HSS (110) needs to trigger the Cancel Location procedure. At this point the HSS may know some information about the old MME (130) but may not know its address. For example, the HSS may know the Diameter Origin Host value of the old MME (130). In order to send the Cancel Location message, the HSS needs to find the address of the old MME (130). It could use the Discovery Protocol (320) with the Target Identifier set to the Origin Host and the Interface Type set to S6a. Once the discovery is complete, the Cancel Location procedure can be performed (325, 330). On completion of the Cancel Location, the HSS (110) can complete the Update Location by sending an Update Location Answer (335) to the MME (145). The Attach procedure can then continue (340). The example in this figure is specific to the S6a interface type. The HSS needs to communicate with the S6a interface on the old MME in order to perform the cancel location procedure.

Figure 4:
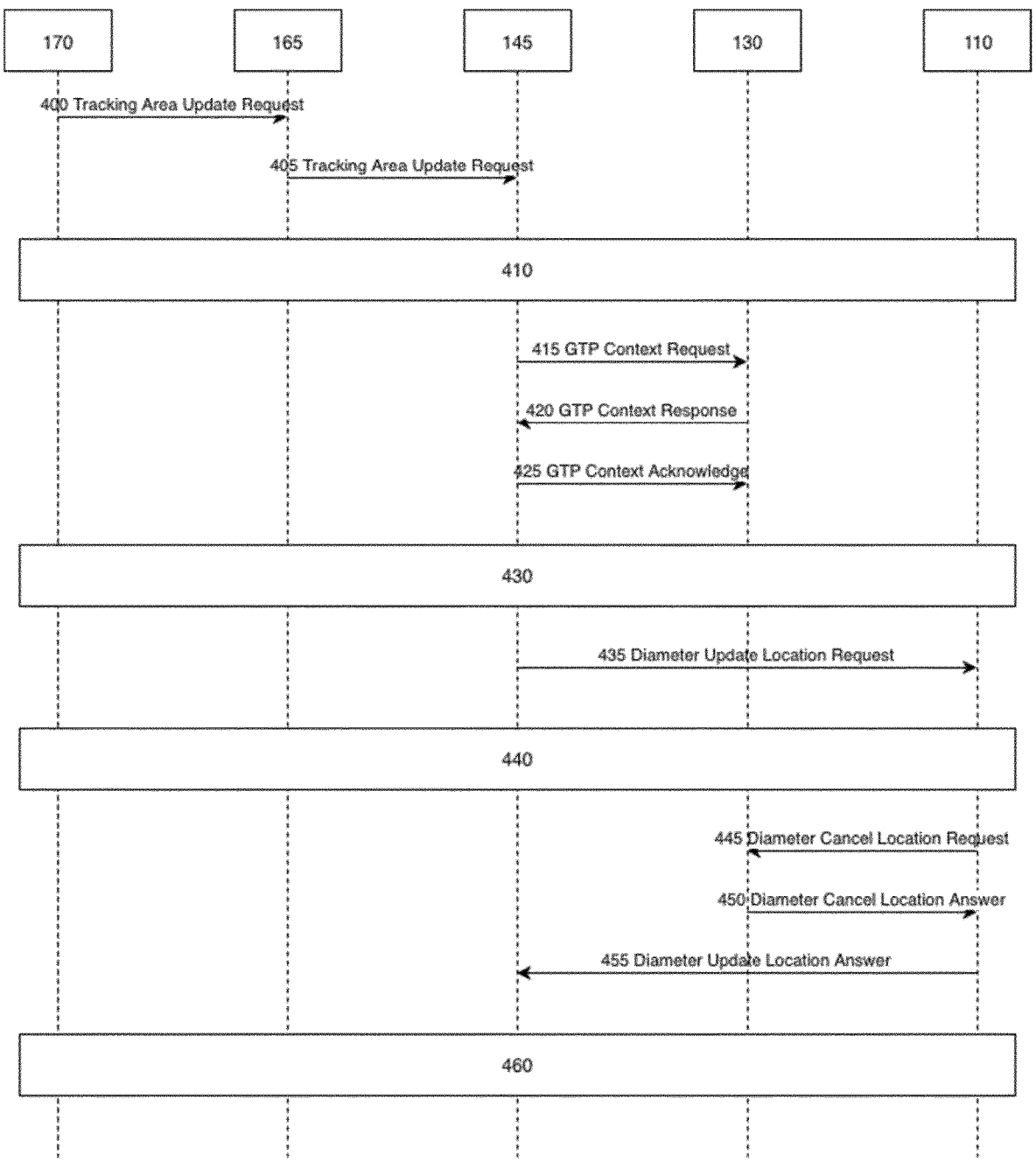
FIG. 4 shows a message sequence chart corresponding to the use of a discovery protocol during relocation.

FIG. 4 shows an example of two possible uses of the Discovery protocol during a Relocation procedure. The UE (170) initiates Relocation by moving to a new eNodeB (165) and sending a Tracking Area Update Request (400) containing the GUTI assigned to the UE (170). This is forwarded (405) by the eNodeB (165) to the target MME (145). The target MME (145) receives the GUTI of the UE (170) and from this can determine the GUMMEI of the original MME (130) that assigned the GUTI, but the target MME (145) does not know the address of the original MME (130). The target MME (145) can use the Discovery Protocol (410) with the Target Identifier set to the GUMMEI of the original MME (130), and with the interface type set to S10. On completion of the Discovery Protocol the target MME (145) can perform the GTP Context procedure (415, 420, 425) with the original MME (130). The Tracking Area Update procedure continues by setting up GTP bearers (430). Next the target MME (145) initiates the Update Location procedure by sending the Diameter Update Location Request (435) to the HSS (110). The HSS (110) now needs to trigger the Cancel Location procedure towards the original MME (130). At this point the HSS may know some information about the original MME (130) but may not know its address. For example, the HSS (110) may know the Diameter Origin Host value of the original MME (130). In order to send the Cancel Location message, the HSS (110) needs to find the address of the original MME (130). It can use the Discovery Protocol (440) with the Target Identifier set to the Origin Host and the Interface Type set to S6a. Once the discovery is complete, the Cancel Location procedure can be performed (445, 450). On completion of the Cancel Location, the HSS (110) can complete the Update Location by sending an Update Location Answer (455) to the target MME (145). The Tracking Area Update procedure can then continue (460)

Figure 5:
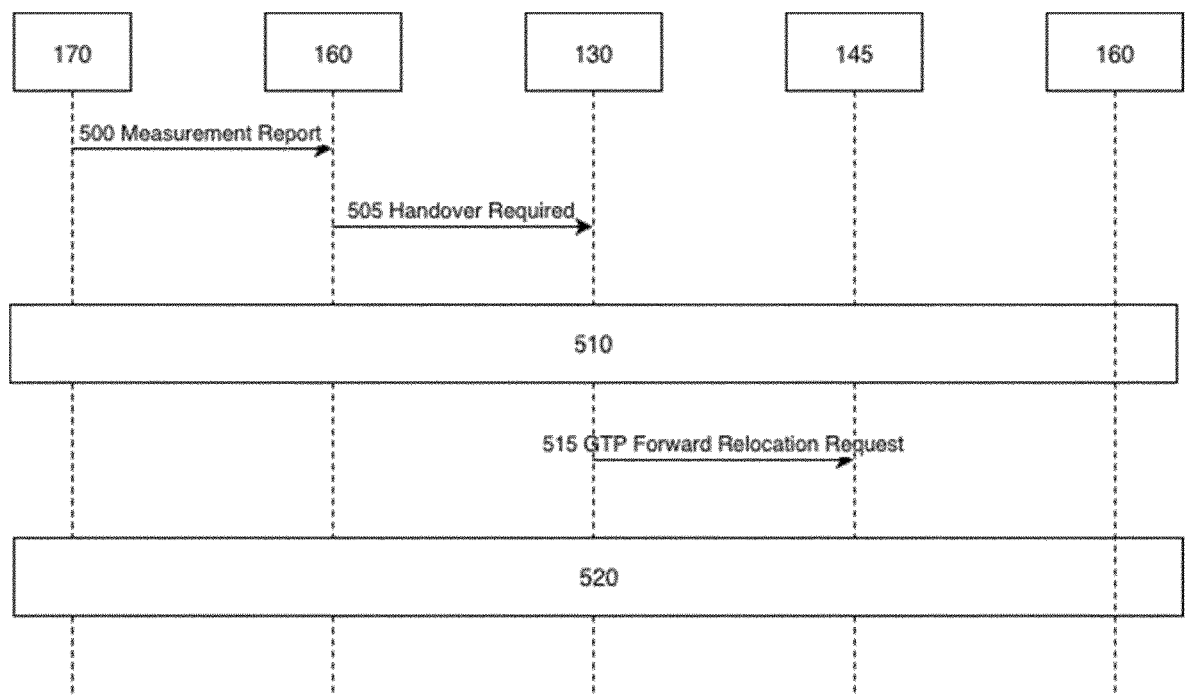
FIG. 5 shows a message sequence chart corresponding to the use of a discovery protocol during handover.

FIG. 5 shows a possible example of use of Discovery during the Handover procedure. The UE (170) monitors the signal strength and quality of surrounding eNodeBs (160) and reports the results to the eNodeB (165) in a Measurement Report (500). Based on received measurements the eNodeB (165) decides to hand the UE over to another eNodeB (160). The eNodeB (165) initiates the handover by sending a Handover Required message (505) to original MME (130). The Handover Required message contains two values that can be used to identify the target MME (145). It contains the Global eNodeB ID of the target eNodeB (160) and it contains the TAI value broadcast by the target eNodeB (160). The original MME (130) can use the Discovery Protocol (510) to find the address of the target MME (145). The Target Identifier could be set to either Global eNodeB ID or TAI and the Interface Type would be set to S10. On completion of the Discovery Protocol the original MME (130) can send the GTP Forward Relocation Request (515) message to the target MME (145). The handover procedure can then continue (520).

When the discovery protocol is used during the examples shown in FIGS. 3, 4 and 5, a request for Diameter Origin Host is a request to the MME for its S6a interface, or a request for Global eNodeB ID, TAI and GUMMEI are requests for the MME S10 interface.

ADVANTAGES OF INVENTION

The invention significantly reduces the configuration required in the network when compared to an approach where each core network component has to be configured with information about all other network components, to allow communication between the core network components.

The invention reduces the configuration required in the network when compared to an approach where core network components are found using DNS. The invention allows core network components to find addresses of other core network components in scenarios where a centralised DNS server may not be contactable.

The primary target application for this invention is in a mesh network. The mesh network contains many network components. The network components are portable and may be carried by people, or may be attached to vehicles or drones. As the people/vehicles/drones move around, the links between the network components may be intermittent. In this scenario, islands of coverage can form where multiple network components can communicate with each other but are out of range of the rest of the network. Within these islands of coverage, a DNS based solution is impractical and a Discovery Protocol is useful.

Although this invention is described in terms of 4G, there may be analogous examples in 2G, 3G, 5G. It will be further appreciated that, for clarity purposes, the described embodiments of the invention with reference to different functional units and processors may be modified or re-configured with any suitable distribution of functionality between different functional units or processors is possible, without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Aspects of the invention may be implemented in any suitable form including hardware, software, firmware or any combination of these. The invention may optionally be implemented, at least partly, as computer software running on one or more data processors and/or digital signal processors.

Thus, the elements and components of an embodiment of the invention may be physically, functionally and logically implemented in any suitable way. Indeed, the functionality may be implemented in a single unit, in a plurality of units or as part of other functional units. Those skilled in the art will recognize that the functional blocks and/or logic elements herein described may be implemented in an integrated circuit for incorporation into one or more of the communication units. Furthermore, it is intended that boundaries between logic blocks are merely illustrative and that alternative embodiments may merge logic blocks or circuit elements or impose an alternate composition of functionality upon various logic blocks or circuit elements. It is further intended that the small wireless mesh networks depicted herein are merely exemplary, and that in fact many other small wireless mesh network or architectures can be implemented that achieve the same functionality.

Although the present invention has been described in connection with some example embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

The invention claimed is:

1. A discovery protocol for use in a mobile telecommunications network to discover a target core network component of said network, wherein said network comprises:
    at least one base station; and
    core network components comprising at least one Mobile Management Entity (MME), at least one Serving Gateway (SGW) and at least one Packet Gateway (PGW), an HSS; and a discovery request distributor connected to all other network components;
    wherein the protocol comprises the following steps:
    sending a discovery request from a first core network component to said discovery request distributor, where said discovery request includes a target identifier of a target core network component to be discovered;
    forwarding said discovery request to all other core network components within said network;
    receiving a discovery response at the core first network component, from at least one identified target core network component with the defined target identifier and no responses from the other target core network components.

2. A discovery protocol according to claim 1, wherein said discovery request distributor is a switch.

3. A discovery protocol according to claim 1, wherein said discovery request distributor is a router.

4. A discovery protocol according to claim 1, wherein said target identifier is one or more of: Tracking Area Identifier (TAI), a Globally Unique MME Identifier (GUMMEI), a Diameter Origin Host a Tracking Area Code (TAC) or a base station identifier.

5. A discovery protocol according to claim 1, further comprising the step of:
    sending an interface message from said first core network component to said identified target core network component after said discovery response is received at said first core network component.

6. A discovery protocol according to claim 1, wherein said discovery request further comprises an interface type.

7. A discovery protocol according to claim 6, wherein the interface type is one of S1, S5, S6a, S10 or S11.

8. A discovery protocol according to claim 1, wherein said discovery request also comprises a target component type.

9. A discovery protocol according to claim 8, wherein said component type is one of MME, SGW, PGW, HSS.

10. A discovery protocol according to claim 1, wherein said discovery request also comprises protocol type information.

11. A discovery protocol according to claim 10, wherein said protocol type information is one of GTP, Diameter or S1AP.

12. A discovery protocol according to claim 1, wherein said discovery response includes a target address for said target core network component.

13. A discovery protocol according to claim 12, wherein said target address is one of IPv4 address, IPv6 address, MAC address or FQDN.

14. A discovery protocol according to claim 1, wherein said first core network component sending said discovery request is a first MME.

15. A discovery protocol according to claim 1, wherein said target core network component providing said discovery response is a second MME.

16. A discovery protocol according to claim 1, further comprising the step of:
    receiving the discovery response at the discovery request distributor and forwarding the response to said first core network component.

17. A discovery protocol according to claim 1, wherein the first core network component receives a plurality of discovery responses from target core components with the defined target identifier, and the first core network component will choose a preferred target core component from all of the responding target core components to use.

18. A discovery protocol as in claim 1, further comprising a method for attaching a wireless subscriber unit to a base station includes the steps of:
    sending an attach request from said wireless subscriber unit to said base station;
    executing the discovery protocol as claimed; and
    performing an attach completion process.

19. A discovery protocol as in claim 1, further comprising a method for relocation of a wireless subscriber unit within a network from a first base station to a second base station comprising the steps of:
    sending a tracking area update request from said wireless subscriber unit to said second base station;
    executing the discovery protocol; and
    performing a GTP bearer set-up process.

20. A discovery protocol as in claim 19, further comprising the steps of:
    executing a further discovery protocol after said GTP bearer set-up; and
    completing said tracking area update.

21. A discovery protocol as in claim 1, further comprising a method for handover of a wireless subscriber unit within a network from a first base station to a second base station comprising the steps of:

sending a handover request from the first base station to the MME of said wireless subscriber unit;
executing the discovery protocol; and
completing said handover process.

* * * * *